May 3, 1960
R. O. SCOFIELD
2,935,156
COMBINED AIR FILTERING AND AIR
DISINFECTING UNIT MOUNTING
Filed Jan. 23, 1958
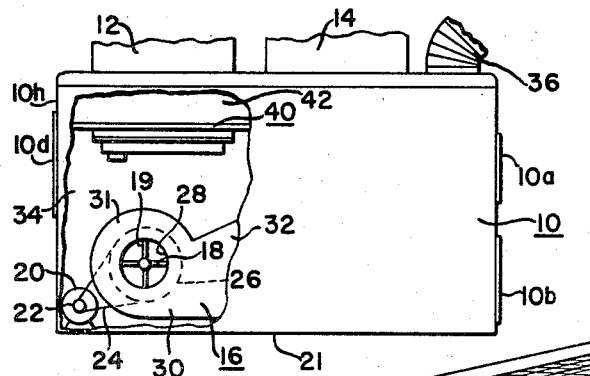
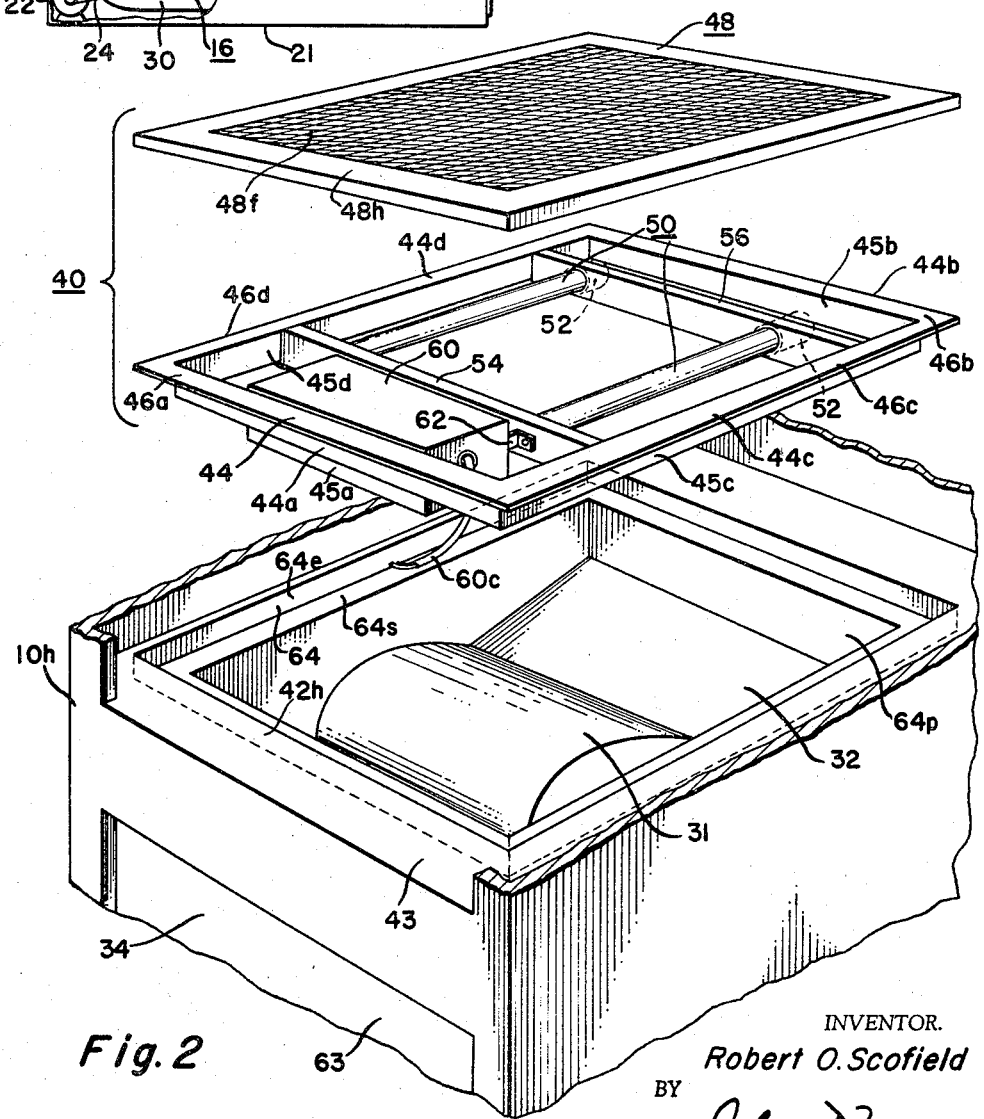
INVENTOR.
Robert O. Scofield
BY
John T. Marvin
His Attorney United States Patent Office 2,935,156
Patented May 3, 1960

2,935,156

COMBINED AIR FILTERING AND AIR DISINFECTING UNIT MOUNTING

Robert O. Scofield, Warren, Ohio, assignor to General Motors Corporation, Detroit, Mich., a corporation of Delaware Application January 23, 1958, Serial No. 710,764

2 Claims. (Cl. 183—44)

This invention relates to a combined filter and lamp mounting, and particularly, to a filter mounting frame provided with a combined hanger means for support of germicidal lamp means used for purifying air that can be circulated through operation of an air conditioner for heating, cooling, and/or dehumidifying and the like.

An object of this invention is to provide a new and improved combined air disinfecting lamp and filter mounting means.

Another object of this invention is to provide a new and improved mounting arrangement including a frame for positioning a filter means, germicidal lamp means, and a transformer control therefor, adjacent to each other in a unitary assembly for use in purifying air that is circulated by operation of a space cooling, heating, or dehumidifying means.

Another object of this invention is to provide a filter mounting frame having a plurality of transverse hanger means for supporting germicidal lamp means and a transformer for energization thereof at one side of a plant portion of a frame for supporting air filtering means as a combined air disinfecting and filtering unit.

Another object of this invention is to provide an air disinfecting and filtering unit including frame means having a platform portion on which an air filtering element is supported and having a hanger or rack portion where germicidal lamp means and energizing means therefor are supported on one side of the filtering unit.

Another object of this invention is to provide a combined air filter mounting and air disinfecting means mounting unit adapted to be inserted through an opening of a housing of an air treating means having a recess for positioning of the unit including a frame having a platform portion for support of an air filtering element and having a hanger or rack portion for support of an air disinfecting equipment on one side of the filtering element through which air is diffused and relieved of foreign solid matter such as dust and from which air passes in an effluent condition through a space adjacent to the hanger portion for support of the air disinfecting equipment which kills substantially all or a large percentage of bacteria and disease-causing material that may be carried in the air.

Further objects and advantages of the present invention will be apparent from the following disclosure.

In the drawings:

Figure 1 is a fragmentary partially sectioned elevational view of an air conditioning and/or furnace means in which the combined air disinfecting and filter unit mounting in accordance with the present invention is shown installed for air purifying purposes.

Figure 2 is a fragmentary perspective exploded view of the combined unit mounting of Fig. 1 and includes a showing of the frame means, filtering element and disinfecting means supported as a unit adapted to be inserted in space of an air duct housing.

With particular reference to Fig. 1, there is shown an air conditioner for heating, cooling, and/or dehumidifying generally indicated by numeral 10. For purposes of illustration, this air conditioner 10 is shown as a furnace having a cold air return or input duct 12 and a hot air or output duct 14. In instances where a forced air circulating system such as the furnace or air conditioning unit 10 is operating to lower the temperature of air, the input duct 12 will supply warm air being returned to the air conditioner while the output duct 14 is used to direct passage of cool air to space in rooms or elsewhere after the air is treated using the structure indicated schematically in Fig. 1. The combined lamp and filter mounting of the present invention can be used in both warm air and cold air systems. Thus the functions of the ducts 12 and 14 are reversible so far as the passage of hot and cool air is concerned. In any event, air is being always returned through duct 12 to the air conditioning unit 10.

For forcing flow of air, there is provided a blower generally indicated by numeral 16 having a rotor 18 that carries a plurality of radially outwardly extending fan blades 19 driven by an electric motor 20 mounted in a base portion 21 of the air conditioning unit 10. The electric motor 20 is provided with a pulley 22 engaged by a belt 24 which also extends about the periphery of a pulley 26 attached in a usual manner to a shaft of the rotor 18 of the blower. The fan blades 19 are so located that air can be drawn through an opening 28 of a blower housing 30 which has a substantially annular portion 31 into which the air is driven by the fan blades 19. Air is forced from the blower housing as the fan is driven by the electric blower motor 22 in a counterclockwise direction of rotation as viewed in Fig. 1 to a duct 32 leading to means for heating, cooling, and/or dehumidifying, such as the particular case may be, from where the air is circulated by blower force to the output duct 14. The blower serves to transfer air from a space 34 between input duct 12 and blower opening 28. Also shown in Fig. 1 is a pipe or output conduit 36 for directing air into space in a room or basement where the unit 10 is installed.

The unit 10 is provided with an upper door 10a and a lower door 10b to permit inspection and servicing of components of the heating, cooling, and/or dehumidifying means of unit 10 which do not form part of the present invention and are therefore only mentioned to provide a better understanding of the environment in which the combined air filtering and air disinfecting unit mounting of the present invention is used. At an end of the unit 10 opposite to the end where the doors 10a and 10b are provided, there is an additional door 10d which is suitably hinged relative to a housing 10h of the unit 10 and which permits inspection and servicing of filtering means and blower motor provided in the space 34. The space 34 commonly is referred to as a plenum chamber and is adjacent to a combined air filtering and air disinfecting unit mounting generally indicated by numeral 40 which is provided between the blower and air return duct 12. This unit mounting 40 is mounted on or suspended from an intermediate wall portion 42 provided in the housing 10h of the unit 10 in accordance with the present invention.

The specific structural arrangement of the combined air filtering and air disinfecting unit mounting 40 relative to the wall portion 42 is visible and understandable more clearly as shown in the exploded perspective view of Fig. 2. In Fig. 2 the door 10d has been removed completely for purposes of clarity and a fragmentary sectional showing of the housing 10h indicates that an opening 43 is provided spaced laterally of the combined air filter and air disinfecting unit mounting means 40 through the opening either with or without tilting of a rectangular frame indicated by numeral 44. The frame 44 includes lateral end members 44a and 44b as well as longitudinal side members 44c and 44d. Each of the members 44a, 44b, 44c, and 44d have downwardly extending portions 45a, 45b, 45c, and 5d, respectively, as well as laterally outwardly extending flange portions 46a, 46b, 46c and 46d, respectively. The laterally outwardly extending flange portions 46a—46d form a platform portion of the frame 44. The platform portion is adapted to be complementary to a filter or "dust stop" type of filter generally indicated by numeral 48 which is carried parallel to the platform portion of the frame 44. The filter 48 has a fiberglass or metallic filtering means 48f enclosed by a suitable filter frame or housing 48h. The filter means 48 when placed on the platform portion of the frame mounting 44 is located adjacent to an air disinfecting means including at least one and preferably a plurality of germicidal lamps generally indicated by numeral 50.

These germicidal lamps are of a type available commercially for air disinfecting purposes such as accomplished by ultra-violet rays or the like emitted from such lamps. The germicidal lamps are intended primarily for use in warm air systems. When the lamp and filter mounting is used in a warm air system, it must be mounted on the cold and not the warm air duct side of the furnace because it has been found that when such a lamp is positioned in the warm air the efficiency of the lamp is impaired considerably. The germicidal lamps are mounted and electrically connected through sockets 52 indicated in phantom in Fig. 2. The germicidal lamps as well as the sockets are carried by transverse hangers or partition members 54 and 56 connected to and extending between longitudinal side members 44c and 44d as shown in Fig. 2. It is to be understood that one or more lamps with separate ballasts or energizing transformers can be used. Also, the lamps can be mounted across corners or diagonally yet parallel and adjacent to the filter 48. Also, one tube or germicidal lamp means which is formed in a circle can be used in a location immediately adjacent and parallel to the filter 48. A transformer generally indicated by numeral 60 is provided to energize the illustrated germicidal lamps 50 and this transformer means is mounted by brackets such as bracket 62 relative to the transverse hanger or partition 54 and lateral member 44a at one end of the frame 44. An electric insulated cord 60c is shown extending from the transformer means 60 for connection with a source of electric power such as is used to energize the electric blower motor referred to in Fig. 1. By connecting this cord 60c with the control switch of the blower motor 20, the germicidal lamps can be excited and energized during periods of time to coincide with periods of operation of the blower 16 shown in Fig. 1.

The annular portion 31 as well as the duct portion 32 of the blower can be seen in the perspective view of Fig. 2. As noted earlier the blower is located in the space 34 within the housing 10h. An opening 63 can be provided behind the door 10d and extending through a side wall of the housing 10h to provide access to this blower and the blower motor. The lateral platform or flange portion of the frame 44 is adapted to be inserted in a recess 64 provided in a wall portion 42h. The recess 64 has a lateral or edge portion 64e slightly wider and longer than the peripheral edges of the flange portions of the frame 44 and an underside of the flange portions of the frame 44 is engaged on top of a shoulder portion 64s formed about the periphery of a passage 64p through which the downwardly or vertically extending flange portions 45a—45d are inserted. The filter housing 48h is prevented from moving in a horizontal direction due to engagement of the peripheral edges of the housing 48h relative to the edge portion 64e of the recess 64. In assembling the combined air filtering and air disinfectant unit mounting of the present invention into the recess 64, the frame 44 can be inserted first into the recess 64 so that the filter 48 can be placed onto or removed from the platform portion of the frame 44 in the recess 64 at will or the filter 48 can be attached to the platform portion of the frame 44 in which germicidal lamps 50 and transformer are already installed and the unit mounting as a whole must be placed or removed relative to the recess 64. Thus the germicidal lamps 50 as energized emit ultra-violet rays or other rays having air disinfectant functions, are located on the effluent side of the filter immediately adjacent thereto. The air which is returned through input duct 12 is relieved of any dust or solid foreign matter as it is diffused by passing through the filter to space 34. This assures that the germicidal lamps on the plenum chamber side of the filter will not be covered with dust or dirt which could hinder and deleteriously affect the disinfecting function of the lamps. The width and length of the frame 44, filter 48 and lamps 50 can be varied and is dependent upon the size of the particular recess such as recess 64 which may be provided in a furnace or air conditioner in which the combined air filtering and air disinfecting unit of the present invention is mounted.

It is to be understood that the openings 43 and 63 in the housing 10h in Fig. 2 can be made separate as shown or as a single opening depending upon the construction and design of the particular housing. It is to be understood that the frame 44 is adapted particularly for mounting both the filter 48 and the germicidal lamps 50 as well as the transformer means 60 in a unitary structure easily removable or insertable relative to mounting recess 64 as illustrated in Fig. 2. The frame 44 permits positioning of the filter means, the germicidal lamp means, and the transformer for controlling the lamp means adjacent to each other in a unitary asssembly for use in purifying air that is circulated by operation of the blower means in a space cooling, heating, or dehumidifying means. The germicidal lamps 50 are supported by hangers or transverse partitions 54 and 56 parallel to and longitudinally of the filter 48 so as to be most effective in disinfecting the mechanically filtered air which passes through the filter element 48f in a diffused condition to be forced by the blower 16 from the duct 12 and space or plenum chamber 34 to the output duct 14 or output pipe 36. The hangers or transverse portions 54 and 56 provide a rack wherein the germicidal lamp means and energizing means therefor are supported on one side of the filter. Preferably this is the effluent side of the filter as indicated earlier. Due to the combined air filtering and air disinfecting unit using the frame 44 providing a platform portion for carrying the filter 48 and a rack portion for carrying the germicidal lamps and the transformer or energizing means therefor, air which passes from duct 12 into space 34 is diffused and relieved of foreign solid matters such as dust, and also is disinfected for eliminating or killing substantially all or a large percentage of bacteria or disease causing materials that may be suspended or carried in the air.

While the embodiments of the present invention as herein disclosed constitute a preferred form, it is to be understood that other forms might be adopted.

What is claimed is as follows:

1. A combination mounting, comprising, a frame having a platform portion and having a hanger portion integral with and laterally adjacent to said platform portion, filtering means supported directly on said platform portion, germicidal lamp means carried by said hanger portion immediately adjacent and parallel to said filtering means, and an energy-transmitting transformer means for said germicidal lamp means and located relative to said hanger portion within said frame, said frame as well as said filtering means, lamp means, and transformer means all movable and removable together as a unitary structure.

2. For use in an enclosing structure of an air circulating means having an opening and a mounting recess therein, a combination unitary subassembly, comprising, an energy-transmitting means, a filtering element for the circulating air, a germicidal lamp means associated with said energy-transmitting means and located laterally adjacent to said filtering element, and a frame means having a platform portion to receive said filtering element and having a hanger portion to carry both said energy-transmitting means and germicidal lamp means for mounting as a unitary subassembly movable through the opening relative to the mounting recess of the enclosing structure.

References Cited in the file of this patent

UNITED STATES PATENTS

| | | |
|---|---|---|
| 618,439 | Schaffer | Jan. 31, 1899 |
| 637,519 | Mertins | Nov. 21, 1899 |
| 2,221,351 | Kempf | Nov. 12, 1940 |
| 2,628,083 | Rense | Feb. 10, 1953 |
| 2,638,644 | Rauhut | May 19, 1953 |
| 2,732,501 | Blaeker | Jan. 24, 1956 |
| 2,822,476 | Osgood | Feb. 4, 1958 |
| 2,824,343 | Glass | Feb. 25, 1958 |
| 2,855,641 | Stein | Oct. 14, 1958 |